United States Patent
Wang et al.

(10) Patent No.: US 12,474,538 B2
(45) Date of Patent: Nov. 18, 2025

(54) LENS DRIVING DEVICE

(71) Applicant: Changzhou AAC Raytech Optronics Co., Ltd., Changzhou (CN)

(72) Inventors: Yiwei Wang, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 1025 days.

(21) Appl. No.: 17/536,111

(22) Filed: Nov. 29, 2021

(65) Prior Publication Data

US 2022/0171150 A1 Jun. 2, 2022

(30) Foreign Application Priority Data

Dec. 1, 2020 (CN) .......................... 202011381855.5

(51) Int. Cl.
*G02B 7/02* (2021.01)
*G02B 27/64* (2006.01)
*G03B 5/00* (2021.01)
*H01F 7/08* (2006.01)
*H05K 1/02* (2006.01)
*H05K 1/14* (2006.01)

(52) U.S. Cl.
CPC .............. *G02B 7/02* (2013.01); *G02B 27/646* (2013.01); *G03B 5/00* (2013.01); *H01F 7/081* (2013.01); *H05K 1/0277* (2013.01); *H05K 1/14* (2013.01); *G03B 2205/0007* (2013.01); *G03B 2205/0069* (2013.01); *H05K 2201/09036* (2013.01)

(58) Field of Classification Search
CPC .......... G02B 7/02; G02B 27/646; G03B 5/00; G03B 2205/0007; G03B 2205/0069; G03B 30/00; H01F 7/081; H01F 7/122; H01F 7/17; H01F 2007/068; H05K 1/14; H05K 2201/09036; H05K 2201/041; H05K 1/144; H04N 23/687
See application file for complete search history.

(56) References Cited

U.S. PATENT DOCUMENTS

| | | | |
|---|---|---|---|
| 9,036,260 B2 * | 5/2015 | Sugawara | H04N 23/687 359/557 |
| 2019/0072744 A1 * | 3/2019 | Hu | G02B 7/08 |
| 2020/0249421 A1 * | 8/2020 | Hu | H04N 23/6812 |
| 2020/0341289 A1 * | 10/2020 | Minamisawa | G02B 27/646 |

* cited by examiner

*Primary Examiner* — Thomas K Pham
*Assistant Examiner* — Justin W. Hustoft
(74) *Attorney, Agent, or Firm* — Wiersch Law Group

(57) ABSTRACT

A lens driving device related to the field of driving devices and includes a lens assembly and a driving module for driving the lens assembly to move. The driving module includes a first driving module and a second driving module. The lens assembly is accommodated in the first driving module. The second driving module is sleeved on one side of the first driving module away from the lens assembly. The lens assembly is driven by the first driving module and the second driving module that realize movement in multiple different directions, so the lens assembly accommodated in the first driving module realizes movement in multiple directions, thereby achieving good image stabilization effect.

15 Claims, 14 Drawing Sheets

LENS DRIVING DEVICE

TECHNICAL FIELD

The present disclosure relates to the field of driving devices, and in particular to a lens driving device.

BACKGROUND

With development of imaging technology, lens driving devices are widely used in various imaging devices. Combination of lens driving devices and various portable electronic devices such as mobile phones, cameras, computers, etc., is even favored by consumers.

In the related art, a lens of a lens driving device rotates around two cross axes under drive of a driving assembly while movable along a direction of an optical axis However, in a complex environment, a movement direction of the lens is complex and changes rapidly For example, the lens may rotate along the optical axis or move along a direction outside the two cross axes, etc. A conventional driving device is unable to adjust in these directions to realize an image stabilization function of the lens. If movement of the lens is only controlled in directions of the cross axes and the optical axis, image stabilization effect of the lens cannot be achieved perfectly.

Therefore, it is necessary to provide a lens driving device to solve above-mentioned problems.

SUMMARY

The present disclosure provides a lens driving device, which aims to solve problems that conventional driving devices have poor image stabilization effect.

Embodiments of the present disclosure are realized by providing a lens driving device. The lens driving device comprises a lens assembly and a driving module for driving the lens assembly to move. The driving module comprises a first driving module and a second driving module. The lens assembly is accommodated in the first driving module. The second driving module is sleeved on one side of the first driving module away from the lens assembly.

The first driving module comprises a first driving assembly. The first driving assembly drives the lens assembly to translate along an optical axis, a first axis perpendicular to the optical axis, and a second axis perpendicular to the optical axis.

The second driving module comprises a first outer frame, a second outer frame, a bracket assembly, and a second driving assembly. The first outer frame is sleeved on an outer side of the first driving module and is fixedly connected with the first driving module. The second outer frame is sleeved on an outer side of the first outer frame. The second outer frame and the first outer frame are spaced apart.

The bracket assembly is rotatably connected with the first outer frame along a third axis, so the first outer frame rotates around the third axis with respect to the second outer frame. The bracket assembly is rotatably connected with second outer frame along a fourth axis. The first outer frame is suspended in the second outer frame so the bracket assembly drives the first outer frame to rotate together around the fourth axis with respect to the second outer frame. The third axis and the fourth axis are perpendicular to the optical axis. The second driving assembly drives the first driving module to rotate around the third axis and the fourth axis with respect to the second outer frame.

In the embodiment of the present disclosure, the lens assembly is driven by the first driving module and the second driving module that realize movement in multiple different directions, so the lens assembly accommodated in the first driving module realizes movement in multiple directions, thereby achieving good image stabilization effect.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

DETAILED DESCRIPTION OF EMBODIMENTS

Figure 1:
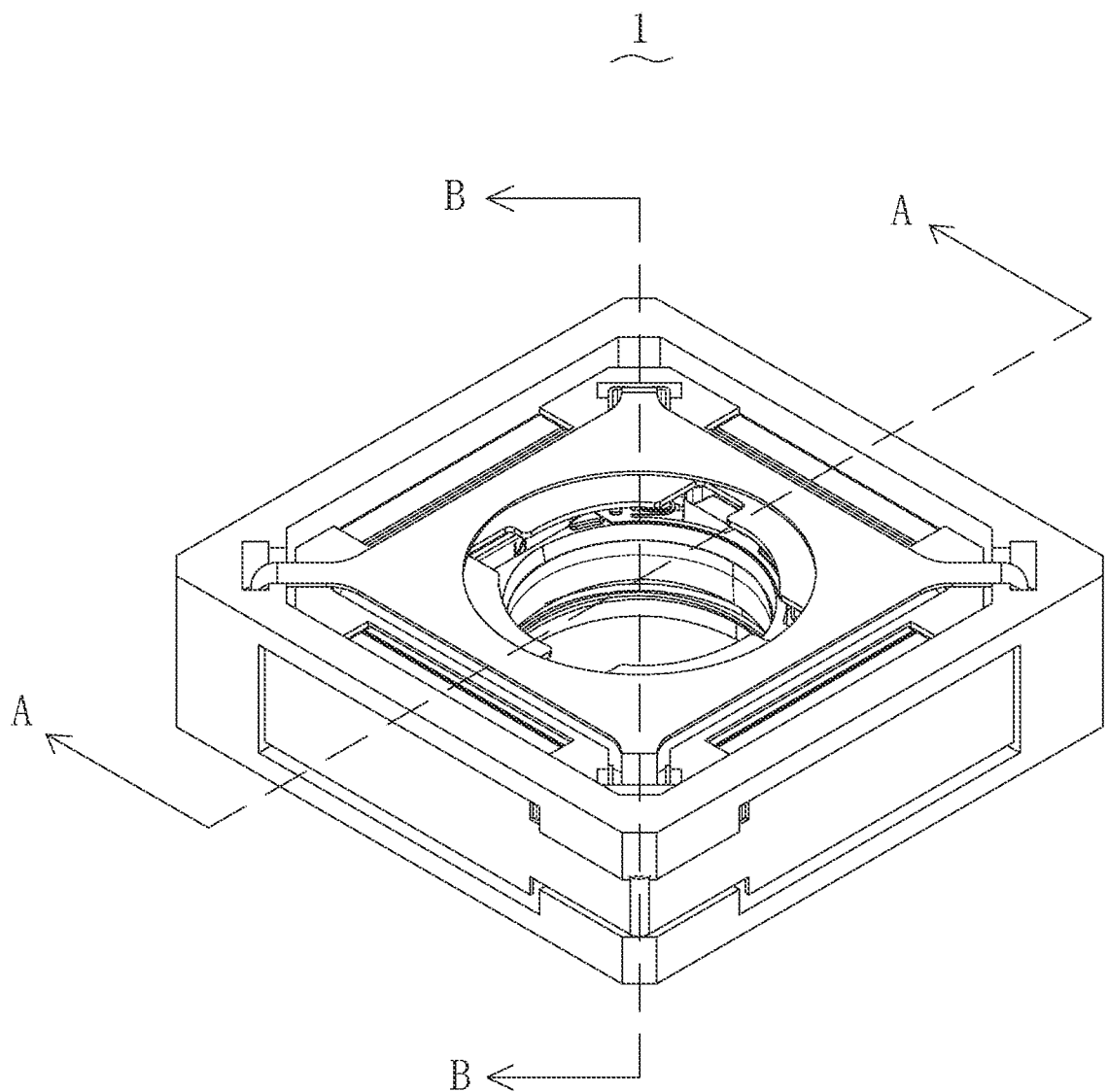
FIG. 1 is a schematic diagram showing an overall structure of a lens driving device according to one embodiment of the present disclosure.

In order to make purposes, technical solutions, and advantages of the present disclosure clear, the following further describes the present disclosure with reference to the accompanying drawings and embodiments. It should be understood that the specific embodiments described herein are only used to explain the present disclosure and are not intend to limit the present disclosure.

Embodiment 1

As shown in FIGS. 1-4, the embodiment of the present disclosure provides a lens driving device 1. The lens driving assembly comprises a lens assembly 140 and a driving module for driving the lens assembly 140 to move. The driving module comprises a first driving module 100 and a second driving module 200. The lens assembly 140 is accommodated in the first driving module 100. The second driving module 200 is sleeved on one side of the first driving module 100 away from the lens assembly 140 (the lens assembly 140 is disposed inside the first driving module 100, and the second driving module 200 is disposed outside the first driving module).

As shown in FIGS. 1-6, the first driving module 100 comprises a base 110, a support frame 120, a housing 130, the lens assembly 140, an elastic sheet assembly 150, a first driving assembly 170. The first driving assembly 170 drives the lens assembly 140 to translate along an optical axis, a first axis E perpendicular to the optical axis, and a second axis F perpendicular to the optical axis.

The support frame 120 comprises an accommodating space 121. The support frame 120 is supported on the base 110. The housing 130 is covered on the base 110, so the support frame 120 is disposed in the housing 130. The lens assembly is accommodated in the accommodating space 121. The elastic sheet assembly 150 elastically supports the lens assembly 140 in the accommodating space 121. The first driving assembly 170 drives the lens assembly 140 to translate along the first axis E perpendicular to the optical axis and the second axis F perpendicular to the optical axis with respect to the support frame 120.

Figure 4:
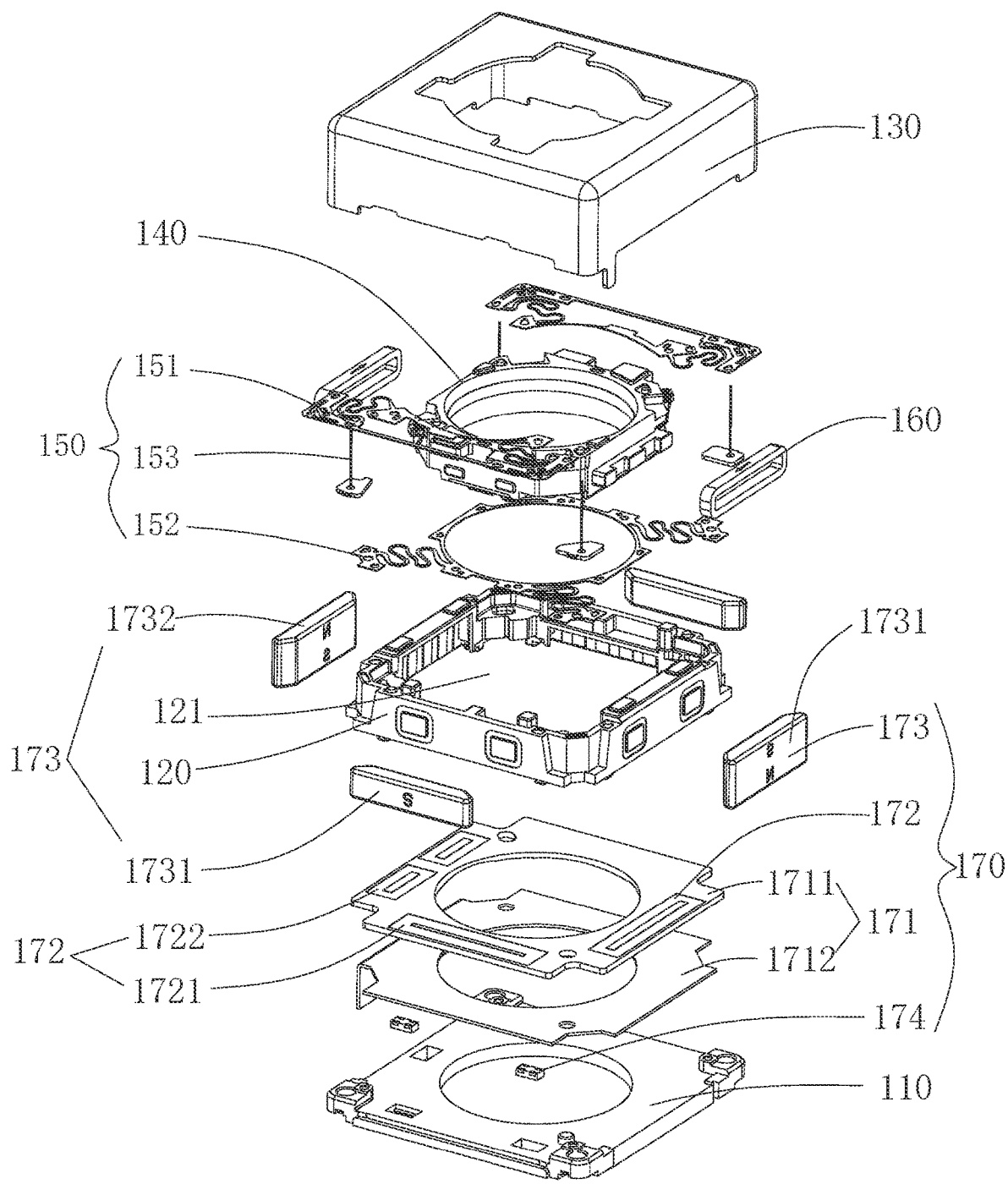
FIG. 4 is another exploded schematic diagram of a first driving module of the lens driving device according to one embodiment of the present disclosure.

As shown in FIG. 4, the elastic sheet assembly 150 comprises an upper elastic sheet 151, a lower elastic sheet 152, and anti-shake hanging wires 153. A first end of the upper elastic sheet 151 is fixed to a top end of the support frame 120. A second end of the upper elastic sheet 151 is fixed to a top end of the lens assembly 140. A first end of the lower elastic sheet 152 is fixed to a bottom end of the support frame 120. A second end of the lower elastic sheet 152 is fixed to a bottom end of the lens assembly 140. A first end of each of the anti-shake hanging wires 153 is connected with the upper elastic sheet 151. A second end of each of the anti-shake hanging wire 153 is fixed on the base 110. The support frame 120 is supported on the base 110 through the anti-shake hanging wires 153.

As shown in FIG. 4, the first driving assembly 170 comprises a first circuit board 171, a first driving coil assembly 172, a first magnet assembly 173, a first Hall sensor 174, and second driving coils 160.

The first circuit board 171 is attached to the base 110. The first driving coil assembly 172 is laid on the first circuit board 171 and is electrically connected with the first circuit board 171. The first magnet assembly 173 is disposed on the support frame 120. Magnetization directions of the first magnet assembly 173 comprise a first magnetization direction parallel to a winding plane of the first driving coil assembly 172. The first driving coil assembly 172 corresponds to the position of the first magnet assembly 173. The first Hall sensor 174 is fixed on the first circuit board 171 for detecting a displacement of the lens assembly 140. The second driving coils 160 are disposed on the lens assembly 140, and the second driving coils 160 cooperates with the first magnet assembly 173 to drive the lens assembly 140 to translate along the optical axis.

Figure 8:
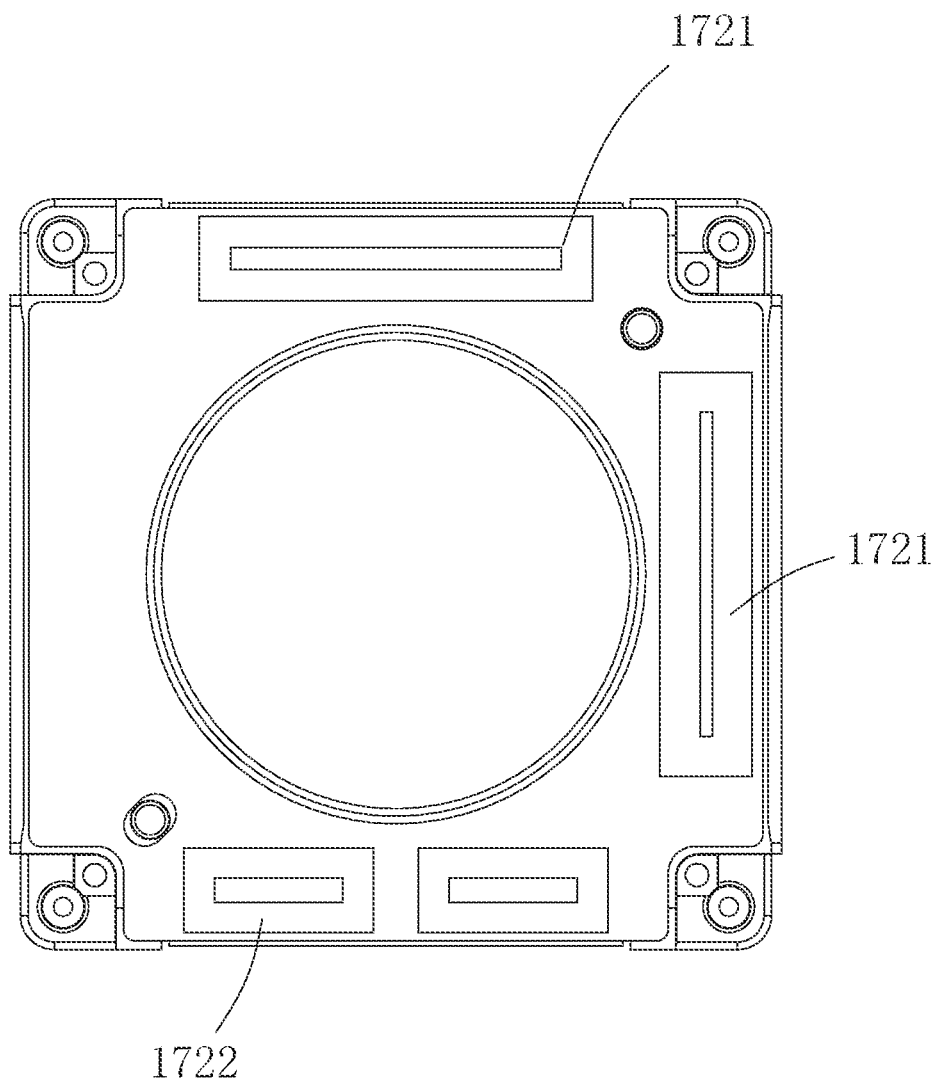
FIG. 8 is a schematic diagram showing a first arrangement of a first driving coil assembly of the lens driving device according to one embodiment of the present disclosure.
Figure 9:
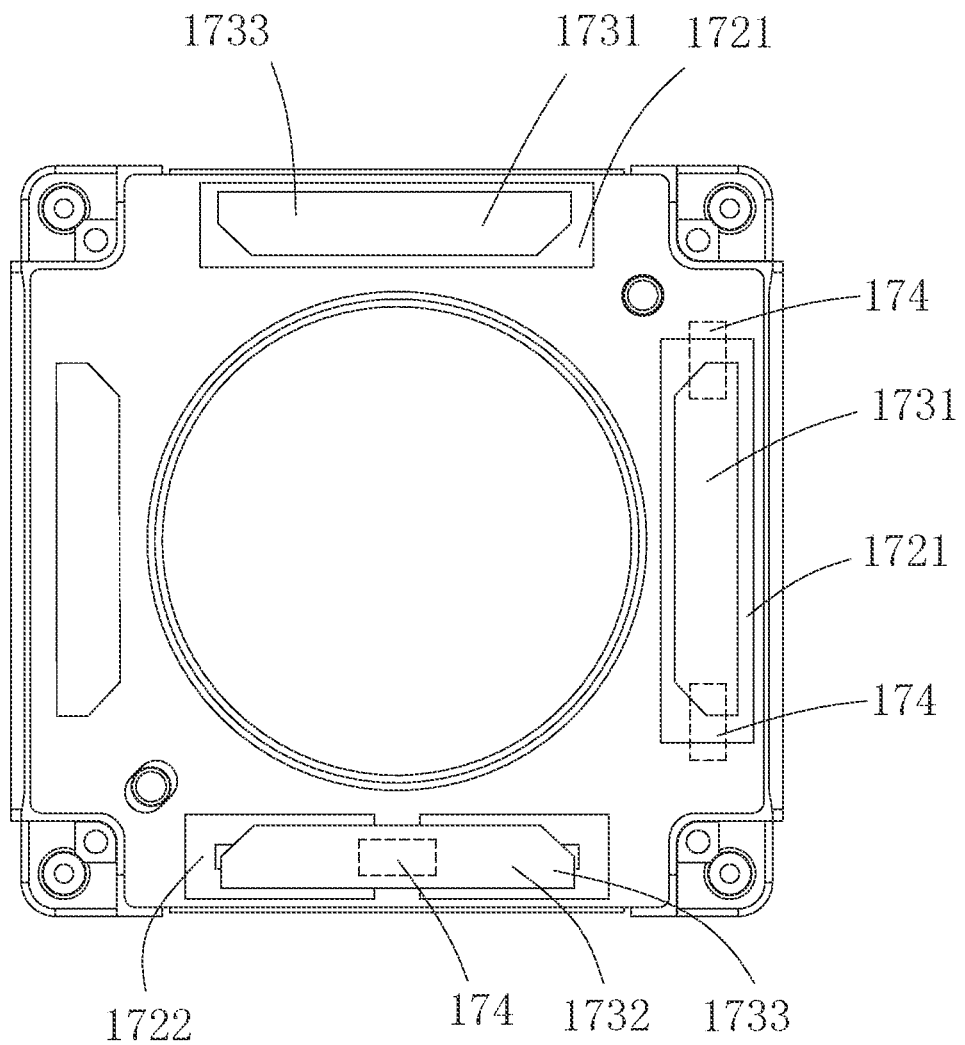
FIG. 9 is a schematic diagram showing arrangements of the first driving coil assembly, a first magnet assembly, and a first Hall sensor of the lens driving device according to one embodiment of the present disclosure.
Figure 10:
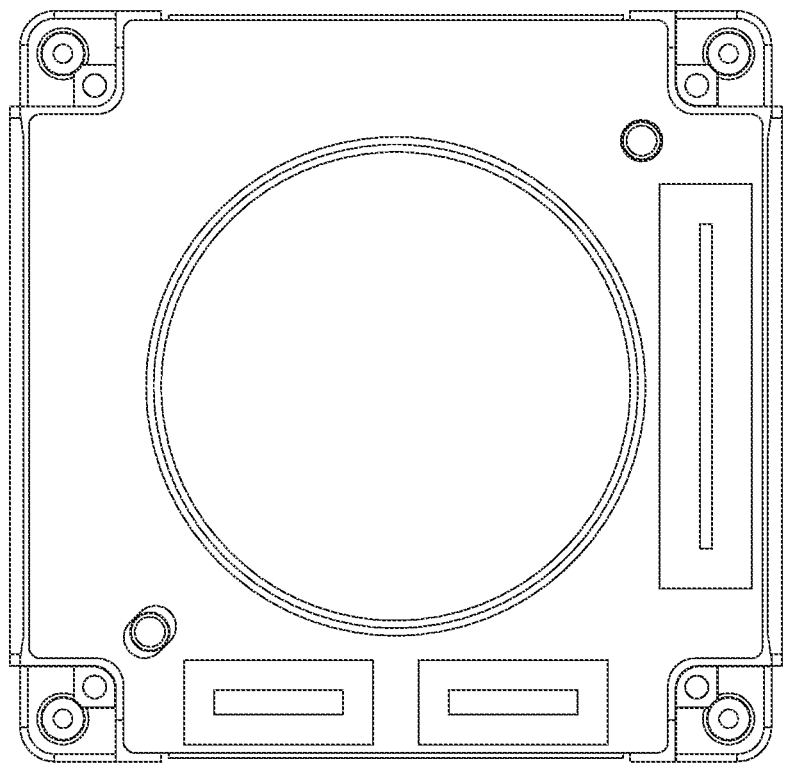
FIG. 10 is a schematic diagram showing a second arrangement of the first driving coil assembly of the lens driving device according to one embodiment of the present disclosure.
Figure 11:
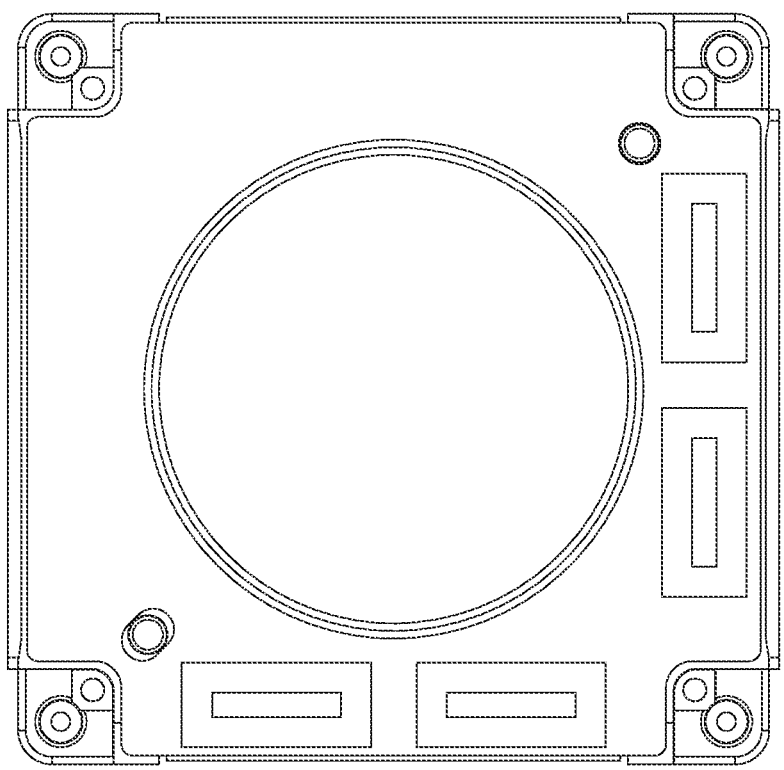
FIG. 11 is a schematic diagram showing a third arrangement of the first driving coil assembly of the lens driving device according to one embodiment of the present disclosure.
Figure 12:
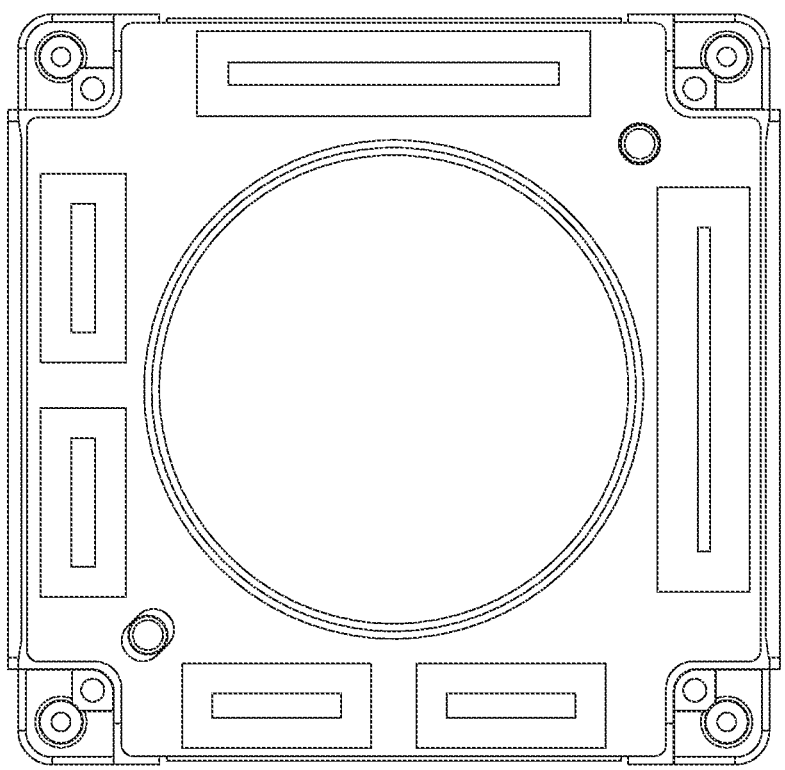
FIG. 12 is a schematic diagram showing a fourth arrangement of the first driving coil assembly of the lens driving device according to one embodiment of the present disclosure.
Figure 13:
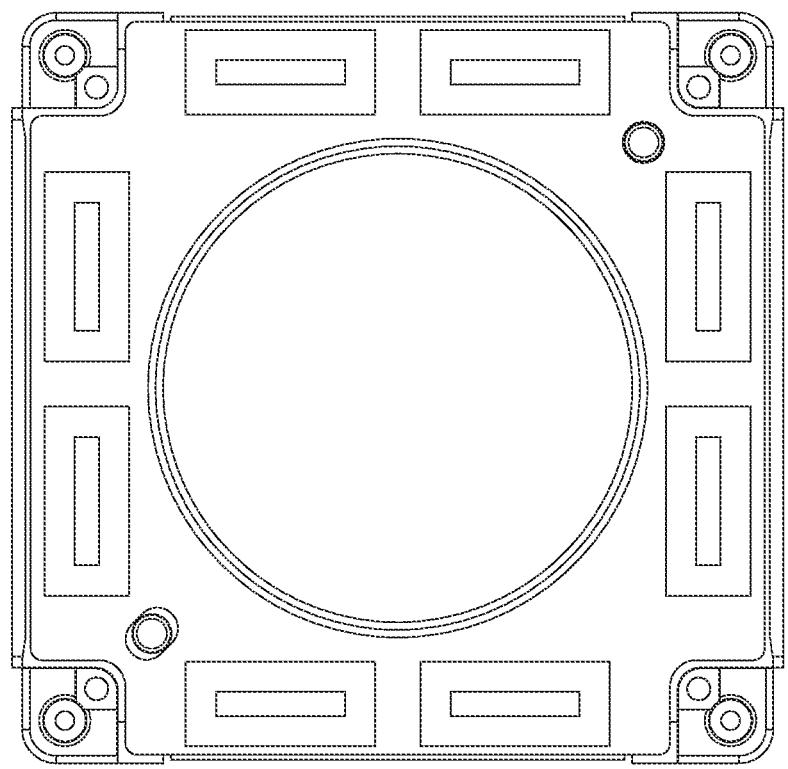
FIG. 13 is a schematic diagram showing a fifth arrangement of the first driving coil assembly of the lens driving device according to one embodiment of the present disclosure.

As shown in FIGS. 8-9, the first Hall sensor 174 is disposed corresponding to two ends or a middle position of the first magnets and the second magnet of the first magnet assembly 173. When the magnets are deflected, the first Hall sensors 174 disposed at both ends of the magnet detects a deflection angle. Since the lens assembly 140 and the support frame 120 are both hung on the base 110 through the elastic sheet assembly 150, the deflection angle of the magnets reflects a deflection angle of the lens assembly 140. In the same way, the first Hall sensor 174 disposed at the middle position of the magnets detects a translation of the magnets, and therefore reflects the translation distance of the lens assembly 140.

As shown in FIGS. 2, 4, 8 and 9, the first magnet assembly 173 comprises first magnets 1731 at least disposed on two adjacent sides of the support frame 120. In the embodiment, two first magnets 1731 are provided for illustration. The first driving coil assembly 172 comprises two first driving coils 1721 for driving the first magnets 1731 and the support frame 120 to translate along the first axis E and the second axis F. The two first driving coils 1721 are disposed corresponding to positions of the two first magnets 1731, and magnetization directions of the two first magnets 1731 are parallel to winding planes of the two first driving coils 1721.

As an improvement, the first magnet assembly 173 further comprises a second magnet 1732 fixed on one side of the support frame 120. The second magnet 1732 is disposed on a side different from the first magnets 1731. The first driving coil assembly 172 comprises third driving coils 1722 for driving the second magnet 1732 and the support frame 120 to rotate around the optical axis. Two third driving coils 1722 are provided. The two third driving coils 1722 are disposed on two ends of the second magnet 1732. The two third driving coils 1722 drive the two ends of the second magnet 1732 to move in opposite directions to drive the support frame 120 to rotate, so as to drive the lens assembly 140 to rotate along the optical axis.

As shown in FIGS. 4 and 9, a winding plane of each of the second driving coils 160 is perpendicular to a winding plane of each of the first driving coils 1721 or a winding plane of each of the third driving coils 1722. The first magnet assembly 173 comprises third magnets 1733 fixed on two sides of the support frame 120. Positions of the third magnets 1733 correspond to positions of the second driving coils 160. In the embodiment, two third magnets 1733 are provided as an example. Due to arrangements of the first magnets 1731 and the second magnet 1732, at least one of the two third magnets 1733 is one of the first magnets 1731 or the second magnet 1732. In the embodiment, the third magnets 1733 are composed of one first magnet 1731 and the second magnet 1732. Since the first driving coils 1721 or the third driving coils 1722 are disposed under the first magnets 1731 and the second magnet 1732, in order to realize translation of the first magnets 1731 and the second magnet 1732, magnetization directions of the first magnets 1731 or the second magnet 1732 comprise a first magnetization direction parallel to the winding planes of the first driving coils 1721 or the winding plane of the third driving coils 1722. Moreover, in order to realize that the second driving coils 160 drives the third magnets 1733 to translate along the optical axis, the third magnets 1733 also comprises a second magnetization direction perpendicular to the winding plane of the first driving coils 1721 or the winding plane of the third driving coils 1722. That is, the one first magnet 1731 and the second magnet 1732 constituting the third magnets 1733 are quadrupole magnets. The lens assembly 140 moves with respect to the third magnets 1733 in a direction parallel to the optical axis under driving of the second driving coils 160 (the third magnets 1733 are driven by driving force of the second driving coils 160).

As shown in FIGS. 4, 5, 8, 9, and 14, since the third magnets 1733 (refer to the first magnet 1731 or the second magnet 1732 in FIG. 9) are quadrupole magnets, the third magnets 1733 have a second magnetization direction perpendicular to the first driving coils 1721 and parallel to the second driving coils 160. Therefore, when the second driving coils 160 are energized, the second driving coils 160 generate an upward driving force on the third magnets 1733, which drives the third magnets 1733 to move in the direction parallel to the optical axis. As shown in FIG. 4, since the lens assembly 140 is disposed in the support frame 120 and is suspended in the support frame 120 by the elastic sheet assembly 150, and the third magnets 1733 are disposed on the support frame 120, when the second driving coils 160 apply driving force to the third magnets 1733, the second driving coils 160 drive the lens assembly 140 to move parallel to the optical axis.

In addition, since the third magnets 1733 have the first magnetization direction parallel to the first driving coils 1721, when the first driving coils 1721 are energized, a driving force perpendicular to the optical axis is generated, thereby driving the third magnets 1733 to translate perpendicular to the optical axis. As shown in FIGS. 4 and 9, since the third magnets 1733 are disposed on the support frame 120, and the support frame 120 is suspended on the base 110, when the first driving coils 1721 drive the third magnets 1733, the support frame 120 drives the lens assembly 140 to translate.

As shown in FIG. 10-13, in the embodiment, an arrangement of the first driving coil assembly (not marked in the drawings) has various forms, and is not limited to the way provided in the embodiment. Based on different arrangements of the first driving coil assembly, an arrangement of the first magnet assembly corresponding to the first driving coil assembly correspondingly changes to realize different driving methods.

As shown in FIG. 4, in the embodiment, the first circuit board 171 comprises a printed circuit board (PCB) 1711 with a groove(not shown in the drawings) and a flexible printed circuit board (FPC) 1712 attached to a side of the PCB 1711 opposite to the base 110. The first driving coil assembly 172 is embedded in the groove. Thus, fixing and limiting of the first driving coil assembly 172 is realized Meanwhile, it is avoided that the first driving coil assembly 172 takes up too much space. The FPC 1712 is disposed on a rear surface of the PCB 1711 to electrically connect with an outside component. The first Hall sensor 174 is disposed on the FPC 1712. The base 110 may be provided with a corresponding avoiding groove (not marked in the drawings) to avoid a position of the first Hall sensor 174.

Figure 14:
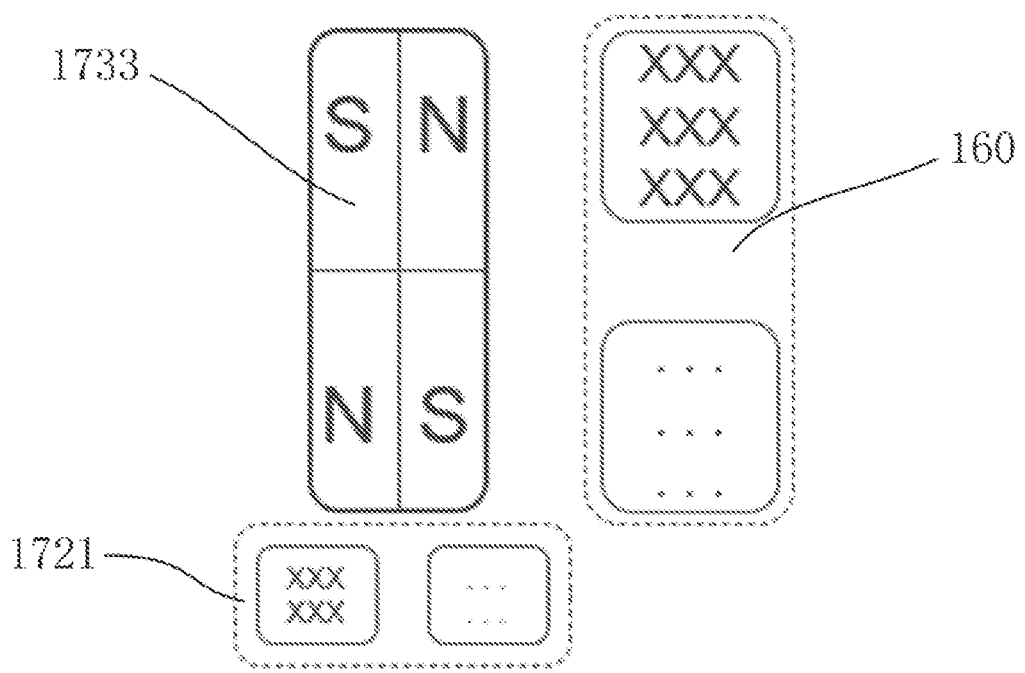
FIG. 14 is a schematic diagram of a driving mode of the first driving module according to one embodiment of the present disclosure.

As shown in FIG. 9 and FIG. 14, in the embodiment, the first driving module 100 drives the lens assembly 140 to translate in two directions (the first axis E and the second axis F) perpendicular to the optical axis. Based on positions of the first driving coil assembly 172 and the first magnet assembly 173, it is noted that the first axis E and the second axis F are perpendicular to each other. Meanwhile, the first driving module 100 is also able to drive the lens assembly 140 to rotate around the optical axis and to translate in the direction parallel to the optical axis. Therefore, in the embodiment, a three-axis anti-shake function of the lens assembly 140 is realized by the first driving module 100.

Figure 2:
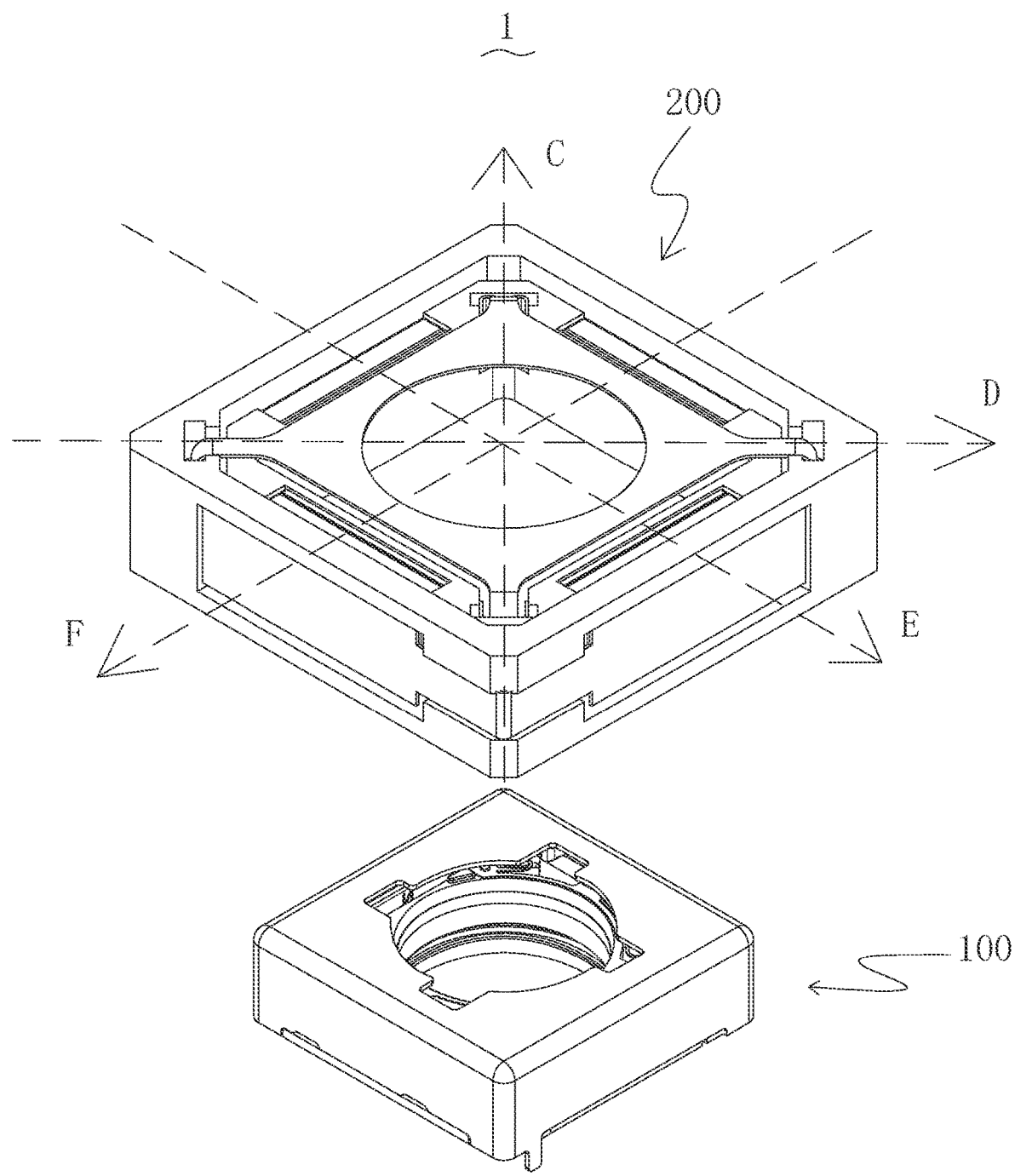
FIG. 2 is an exploded schematic diagram of the lens driving device according to one embodiment of the present disclosure.
Figure 3:
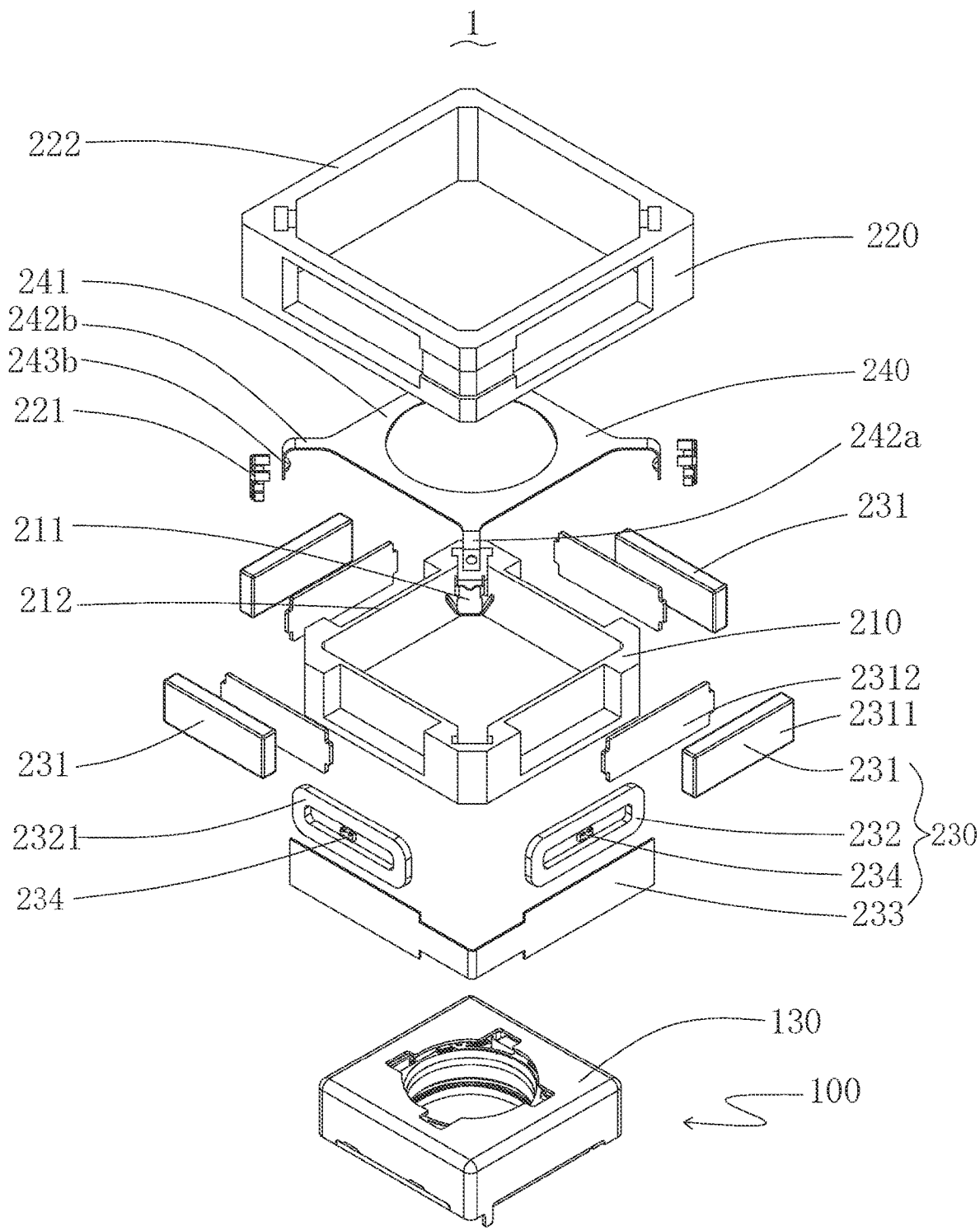
FIG. 3 is another exploded schematic diagram of the lens driving device according one embodiment of the present disclosure.

As shown in FIGS. 2 and 3, the second driving module 200 comprises a first outer frame 210, a second outer frame 220, a bracket assembly 240, and a second driving assembly 230.

The first outer frame 210 is enclosed by first side walls 212. The first outer frame 210 is sleeved on the housing 130 and is fixedly connected with the housing 130.

The second outer frame 220 is enclosed by second side walls 222. The second outer frame 220 is sleeved on the first outer frame 210. The second outer frame 220 and the first outer frame 210 are spaced apart.

The bracket assembly 240 is rotatably connected with the first outer frame 210 along a third axis C, so the first outer frame 210 rotates around the third axis C with respect to the second outer frame 220. The bracket assembly 240 is rotatably connected with second outer frame 220 along a fourth axis D and the first outer frame is suspended in the second outer frame 220, so the bracket assembly 240 drives the first outer frame 210 to rotate together around the fourth axis D with respect to the second outer frame 220. The third axis C and the fourth axis D are perpendicular to the optical axis.

The second driving assembly 230 drives the first driving module 100 (the first driving module 100 is fixed on the first outer frame 210 through the housing 130) to rotates around the third axis C and the fourth axis D with respect to the second outer frame 220.

As shown in FIG. 3, in the embodiment, the second driving assembly 230 comprises a second magnet assembly 231, a second driving coil assembly 232, a second circuit board 233, and a second Hall sensor 234.

The second magnet assembly 231 comprises at least two fourth magnets 2311 disposed on two adjacent first side walls 212 of the first outer frame 210. The second driving coil assembly 232 comprises at least two fourth driving coils 2321 disposed on two adjacent second side walls 222 of the second outer frame 220. Each of the fourth driving coils 2321 is disposed opposite to a corresponding fourth magnet 2311. Each of the fourth driving coils 2321 and the corresponding fourth magnet 2311 are spaced apart. The second circuit board 233 is disposed on an outer periphery of the second outer frame 220 and is electrically connected with the fourth driving coils 2321. The second Hall sensor 234 is disposed on the second circuit board 233 for detecting a displacement of the first driving module 100 (the second Hall sensor 234 detects displacements of the fourth magnets 2311 to reflect the displacement of the first driving module 100).

Figure 5:
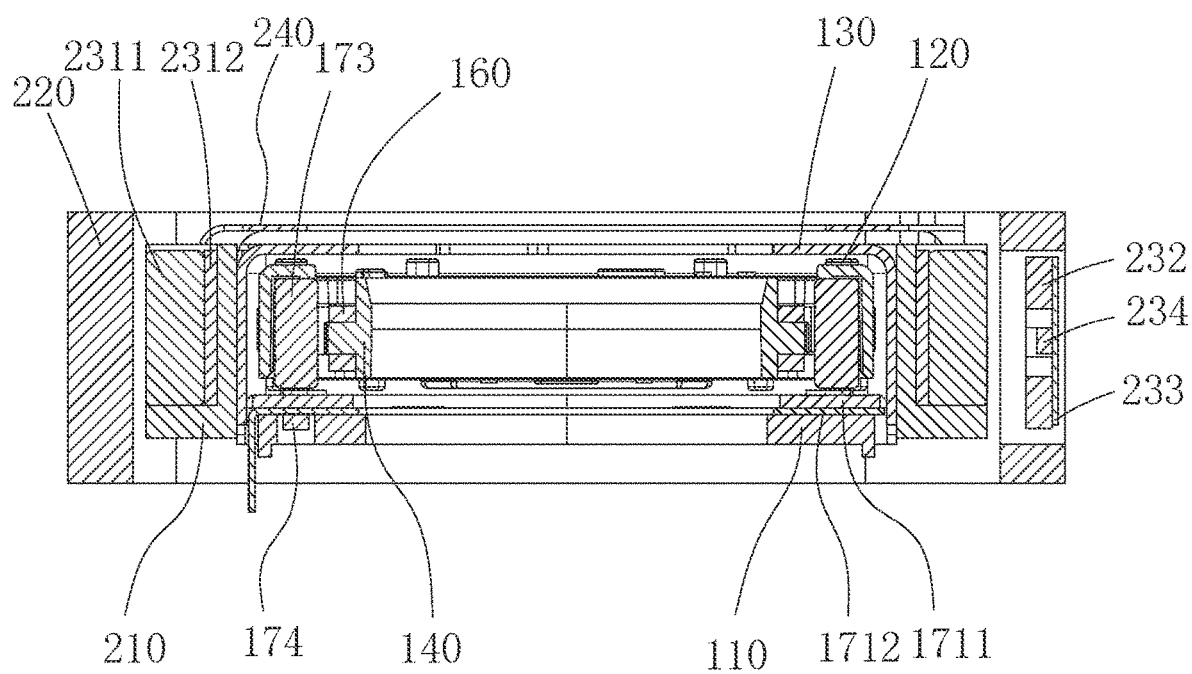
FIG. 5 is a cross-sectional schematic diagram taken along a line A-A shown in FIG. 1.
Figure 6:
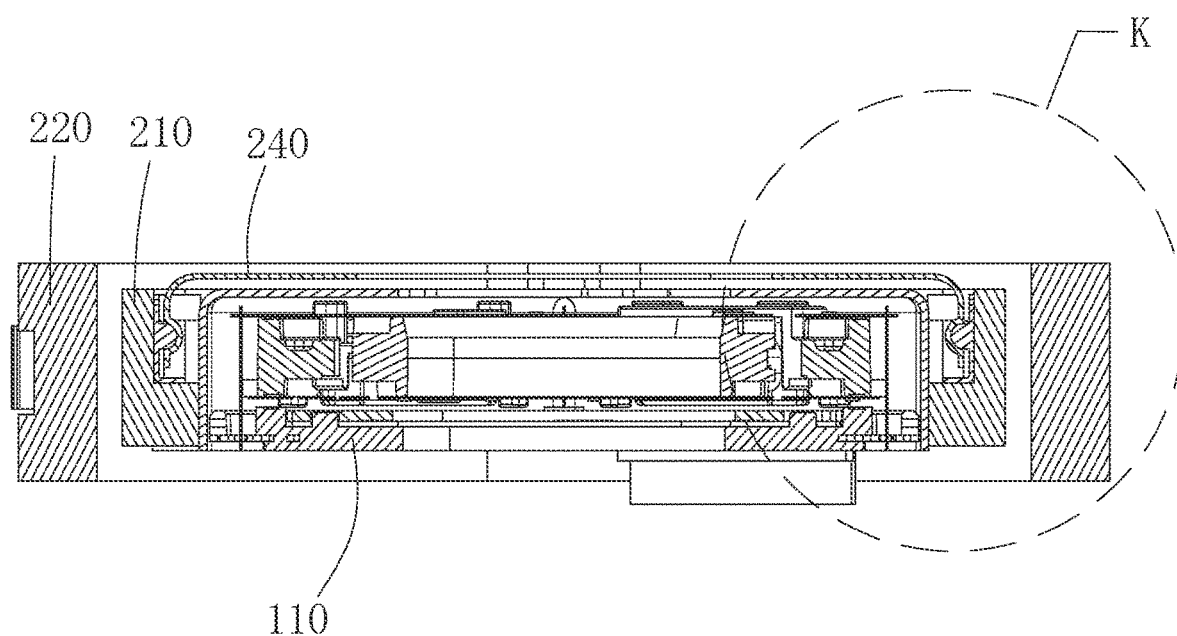
FIG. 6 is a cross-sectional schematic diagram taken along a line B-B shown in FIG. 1.
Figure 7:
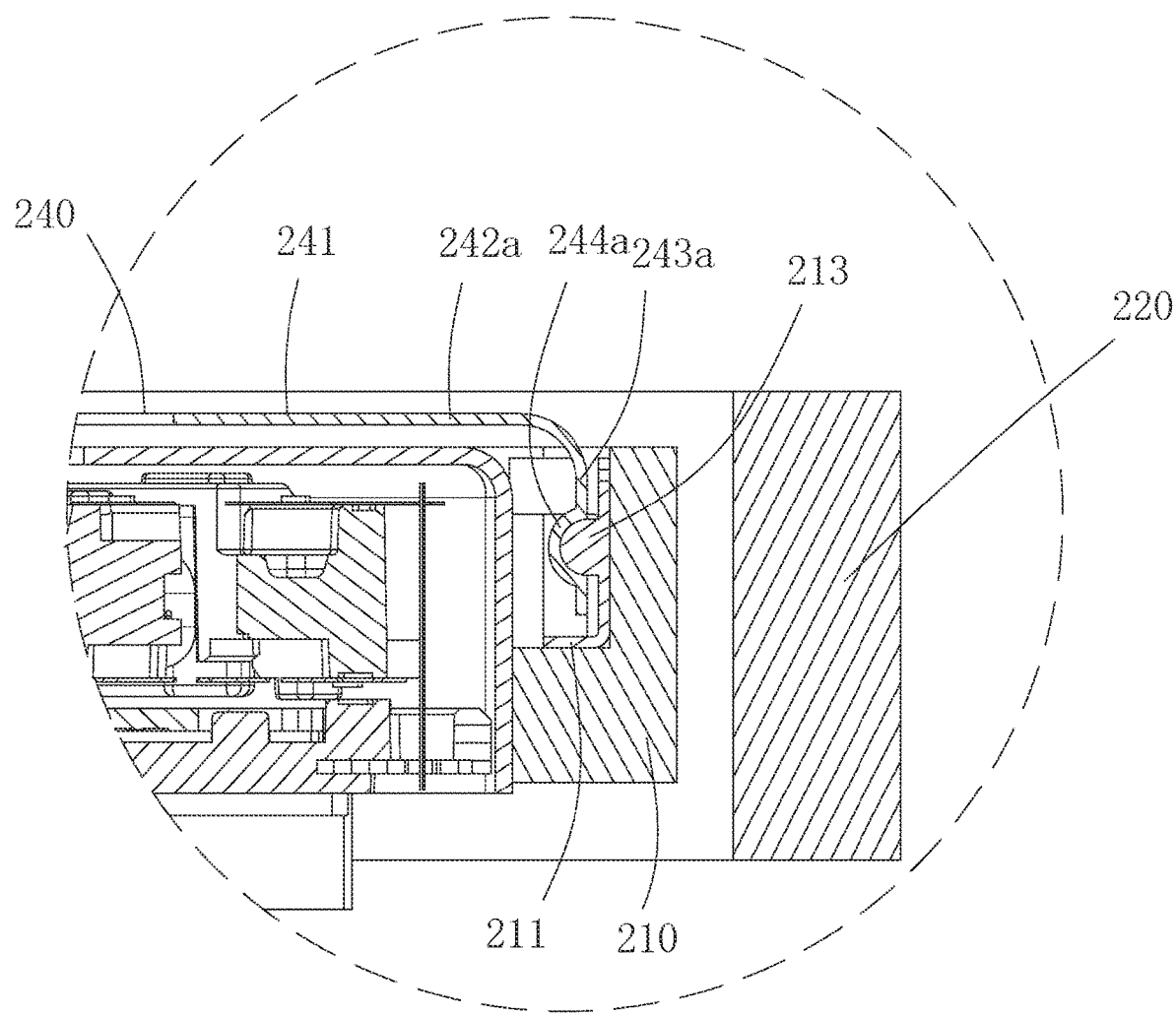
FIG. 7 is an enlarged schematic diagram of area K shown in FIG. 6.

As shown in FIGS. 3 and 5, a magnetic isolation plate 2312 is disposed on one side of each of the fourth magnets 2311 facing the lens assembly 140. The magnetic isolation plates 2312 isolates the fourth magnets 2311 and the first magnet assembly 173 to avoid mutual influence. Therefore, movement between the first driving module 100 and the second driving module 200 does not interfere with each other.

As shown in FIGS. 2, 3, 6, and 7, the bracket assembly 240 comprises a bracket body 241 disposed on an upper portion of the housing 130. First extension portions 242a extending from two ends of the bracket body 241 in a direction of the third axis C, and second extension portions 242b extending from another two ends of the bracket body 241 in a direction of the fourth axis D. The first extension portions 242a are rotatably connected with the first outer frame 210. The second extension portions 242b are rotatably connected with the second outer frame 220.

Specifically, the first extension portions 242a comprise first lower extension portions 243a extending toward the base 110. The first lower extension portions 243a comprises first shaft bases 244a. The first outer frame 210 comprises first shafts 213 corresponding to the first shaft bases 244a. Each of the first shafts 213 is disposed in a corresponding first shaft base 244a. The first shafts 213 are formed by first metal piece 211 embedded on the first outer frame 210.

Each of the first shaft base 244a is configured as a concave hemispherical surface. Each of the first shafts 213 is a hemispherical body. There is a gap between each of the first shafts 213 and the corresponding first shaft base 244a. Through cooperation of the hemispherical surfaces and the hemispherical bodies, positions are limited in an axial direction and to radial direction, which prevents the bracket assembly 240 from having a large deviation in the axial direction while reduces difficulty of limiting of the bracket assembly 240 in the axial direction.

Similarly, as shown in FIG. 3, the second extension portions 242b comprise a second lower extension portions 243b extending toward the base 110. The second lower extension portions 243b comprises second shaft bases (not marked in the drawings) The second outer frame 220 comprises second shafts (not marked in the drawings) corresponding to the second shaft bases. Each of the second shafts is disposed in a corresponding second shaft base. The second shafts are formed by second metal piece 221 embedded on the second outer frame 220.

Similarly, each of the second shaft base is configured as a concave hemispherical surface. Each of the second shafts is a hemispherical body. There is a gap between each of the second shafts and the corresponding second shaft base.

Based on the second driving module 200, the embodiment realizes a two-axis anti-shake function of the lens assembly 140. Combined with the first driving module 100, the embodiment realizes a five-axis anti-shake of the lens assembly 140.

Embodiment 2

As shown in FIG. 4, the embodiment of the present disclosure provide a first driving module 100. The first driving module 100 comprises a base 110, a support frame 120, a housing 130, the lens assembly 140, an elastic sheet assembly 150, and a first driving assembly 170. As shown in FIG. 2, the first driving assembly 170 drives the lens assembly 140 to translate along an optical axis, a first axis E perpendicular to the optical axis, and a second axis F perpendicular to the optical axis.

The support frame 120 comprises an accommodating space 121. The support frame 120 is supported on the base 110. The housing 130 is covered on the base 110, so the support frame 120 is disposed in the housing 130. The lens assembly 140 is accommodated in the accommodating space 121 for mounting lens (not shown in the drawings). The elastic sheet assembly 150 elastically supports the lens assembly 140 in the accommodating space 121. The first driving assembly 170 drives the lens assembly 140 to translate along the first axis E perpendicular to the optical axis and the second axis F perpendicular to the optical axis with respect to the support frame 120.

As shown in FIG. 4, the elastic sheet assembly 150 comprises an upper elastic sheet 151, a lower elastic sheet 152, and anti-shake hanging wires 153. A first end of the upper elastic sheet 151 is fixed to a top end of the support frame 120. A second end of the upper elastic sheet 151 is fixed to a top end of the lens assembly 140. A first end of the lower elastic sheet 152 is fixed to a bottom end of the support frame 120. A second end of the lower elastic sheet 152 is fixed to a bottom end of the lens assembly 140. A first end of each of the anti-shake hanging wires 153 is connected with the upper elastic sheet 151. A second end of each of the anti-shake hanging wire 153 is fixed on the base 110. The support frame 120 is supported on the base 110 through the anti-shake hanging wires 153.

As shown in FIG. 4, the first driving assembly 170 comprises a first circuit board 171, a first driving coil assembly 172, a first magnet assembly 173, a first Hall sensor 174, and second driving coils 160.

The first circuit board 171 is attached to the base 110. The first driving coil assembly 172 is laid on the first circuit board 171 and is electrically connected with the first circuit board 171. The first magnet assembly 173 is disposed on the support frame 120. Magnetization directions of the first magnet assembly 173 comprise a first magnetization direction parallel to a winding plane of the first driving coil assembly 172 The first driving coil assembly 172 corresponds to the position of the first magnet assembly 173. The first Hall sensor 174 is fixed on the first circuit board 171 for detecting a displacement of the lens assembly 140. The second driving coils 160 are disposed on the lens assembly 140, and the second driving coils 160 cooperates with the first magnet assembly 173 to drive the lens assembly 140 to translate along the optical axis.

As shown in FIGS. 8-9, the first Hall sensor 174 is disposed corresponding to two ends or a middle position of one or more of the first magnets and the second magnet of the first magnet assembly 173. When the magnets are deflected, the first Hall sensors 174 disposed at both ends of the magnet detects a deflection angle. Since the lens assembly 140 and the support frame 120 are both suspended on the base 110 through the elastic sheet assembly 150, the deflection angle of the magnets reflects a deflection angle of the lens assembly 140. In the same way, the first Hall sensor 174 disposed at the middle position of the magnets detects a translation of the magnets, and therefore reflects the translation distance of the lens assembly 140.

As shown in FIGS. 2, 4, 8 and 9, the first magnet assembly 173 comprises first magnets 1731 at least disposed on two adjacent sides of the support frame 120. In the embodiment, two first magnets 1731 are provided for illustration. The first driving coil assembly 172 comprises two first driving coils 1721 for driving the first magnets 1731 and the support frame 120 to translate along the first axis E and the second axis F. The two first driving coils 1721 are disposed corresponding to positions of the two first magnets 1731, and magnetization directions of the two first magnets 1731 are parallel to winding planes of the two first driving coils 1721.

As an improvement, the first magnet assembly 173 further comprises a second magnet 1732 fixed on one side of the support frame 120. The second magnet 1732 is disposed on a side different from the first magnets 1731. The first driving coil assembly 172 comprises third driving coils 1722 for driving the second magnet 1732 and the support frame 120 to rotate around the optical axis. Two third driving coils 1722 are provided. The two third driving coils 1722 are disposed on two ends of the second magnet 1732. The two third driving coils 1722 drive the two ends of the second magnet 1732 to move in opposite directions to drive the support frame 120 to rotate, so as to drive the lens assembly 140 to rotate along the optical axis.

As shown in FIGS. 4 and 9, a winding plane of each of the second driving coils 160 is perpendicular to a winding plane of each of the first driving coils 1721 or a winding plane of each of the third driving coils 1722. The first magnet assembly 173 comprises third magnets 1733 fixed on two sides of the support frame 120. Positions of the third magnets 1733 correspond to positions of the second driving coils 160.

In the embodiment, two third magnets 1733 are provided as an example. Due to arrangements of the first magnets 1731 and the second magnet 1732, at least one of the two third magnets 1733 is one of the first magnets 1731 or the second magnet 1732. In the embodiment, the third magnets 1733 are composed of one first magnet 1731 and the second magnet 1732. Since the first driving coils 1721 or the third driving coils 1722 are disposed under the first magnets 1731 and the second magnet 1732, in order to realize translation of the first magnets 1731 and the second magnet 1732, magnetization directions of the first magnets 1731 or the second magnet 1732 comprises a first magnetization direction parallel to the winding planes of the first driving coils 1721 or the winding plane of the third driving coils 1722. Moreover, in order to realize that the second driving coils 160 drives the third magnets 1733 to translate along the optical axis, the third magnets 1733 also comprises a second magnetization direction perpendicular to the winding plane of the first driving coils 1721 or the winding plane of the third driving coils 1722. That is, the one first magnet 1731 and the second magnet 1732 constituting the third magnets 1733 are quadrupole magnets. The lens assembly 140 moves with respect to the third magnets 1733 in a direction parallel to the optical axis under driving of the second driving coils 160 (the third magnets 1733 are driven by driving force of the second driving coils 160).

As shown in FIGS. 4, 5, 8, 9, and 14, since the third magnets 1733 (refer to the first magnet 1731 or the second magnet 1732 in FIG. 9) are quadrupole magnets, the third magnets 1733 have the second magnetization direction perpendicular to the first driving coils 1721 and parallel to the second driving coils 160. Therefore, when the second driving coils 160 are energized, the second driving coils 160 generate an upward driving force on the third magnets 1733, which drives the third magnets 1733 to move in the direction parallel to the optical axis As shown in FIG. 4, since the lens assembly 140 is disposed in the support frame 120 and is suspended in the support frame 120 by the elastic sheet assembly 150, and the third magnets 1733 are disposed on the support frame 120, when the second driving coils 160 apply driving force to the third magnets 1733, the second driving coils 160 drive the lens assembly 140 to move parallel to the optical axis.

In addition, since the third magnets 1733 comprise a first magnetization direction parallel to the first driving coils 1721, when the first driving coils 1721 are energized, a driving force perpendicular to the optical axis is generated, thereby driving the third magnets 1733 to translate perpendicular to the optical axis. As shown in FIGS. 4 and 9, since the third magnets 1733 are disposed on the support frame 120, and the support frame 120 is suspended on the base 110, when the first driving coils 1721 drive the third magnets 1733, the support frame 120 drives the lens assembly 140 to translate.

As shown in FIG. 10-13, in the embodiment, an arrangement of the first driving coil assembly (not marked in the drawings) has various forms, and is not limited to the way provided in the embodiment. Based on different arrangements of the first driving coil assembly, an arrangement of the first magnet assembly corresponding to the first driving coil assembly correspondingly changes to realize different driving methods.

As shown in FIG. 4, in the embodiment, the first circuit board 171 comprises a printed circuit board (PCB) 1711 with a groove(not shown in the drawings) and a flexible printed circuit board (FPC) 1712 attached to a side of the PCB 1711 opposite to the base 110. The first driving coil assembly 172 is embedded in the groove. Thus, fixing and limiting of the first driving coil assembly 172 is realized Meanwhile, it is avoided that the first driving coil assembly 172 takes up too much space. The FPC 1712 is disposed on a rear surface of the PCB 1711 to electrically connect with an outside component. The first Hall sensor 174 is disposed on the FPC 1712. The base 110 may be provided with a corresponding avoiding groove (not marked in the drawings) to avoid a position of the first Hall sensor 174.

As shown in FIG. 9 and FIG. 14, in the embodiment, the first driving module 100 drives the lens assembly 140 to translate in two directions (the first axis E and the second axis F) perpendicular to the optical axis. Based on positions of the first driving coil assembly 172 and the first magnet assembly 173, it is noted that the first axis E and the second axis F are perpendicular to each other. Meanwhile, the first driving module 100 is also able to drive the lens assembly 140 to rotate around the optical axis and to translate in the direction parallel to the optical axis. Therefore, in the embodiment, a three-axis anti-shake function of the lens assembly 140 is realized by the first driving module 100.

Foregoing descriptions are only optional embodiments of the present disclosure and are not intended to limit the present disclosure. Any modification, equivalent replacement, or improvement within spirit and principle of the present disclosure should be included in the protection scope of the present disclosure.

What is claimed is:

1. A lens driving device, comprising:
   a lens assembly; and
   a driving module for driving the lens assembly to move;
   wherein the driving module comprises a first driving module and a second driving module; the lens assembly is accommodated in the first driving module; the second driving module is sleeved on one side of the first driving module away from the lens assembly;
   wherein the first driving module comprises a first driving assembly; the first driving assembly drives the lens assembly to translate along an optical axis, a first axis perpendicular to the optical axis, and a second axis perpendicular to the optical axis;
   wherein the second driving module comprises a first outer frame, a second outer frame, a bracket assembly, and a second driving assembly; the first outer frame is sleeved on an outer side of the first driving module and is fixedly connected with the first driving module; the second outer frame is sleeved on an outer side of the first outer frame; the second outer frame and the first outer frame are spaced apart;
   wherein the first outer frame can rotate along a third axis relative to the bracket assembly and is connected to the bracket assembly; so the first outer frame rotates around the third axis with respect to the second outer frame; the bracket assembly can rotate along a fourth axis relative to the second outer frame and is connected to the second outer frame; the first outer frame is suspended in the second outer frame so the bracket assembly and the first outer frame can rotate together around the fourth axis with respect to the second outer frame; the third axis and the fourth axis are perpendicular to the optical axis; the second driving assembly drives the first driving module to rotate around the third axis and the fourth axis with respect to the second outer frame; wherein the first driving module further comprises a base, a support frame, a housing, and an elastic sheet assembly; the support frame comprises an accommodating space; the support frame is supported on the base; the housing is covered on the base, so the support frame is disposed in the housing; the elastic sheet assembly elastically supports the lens assembly in the accommodating space; wherein the first driving assembly comprises a first driving coil assembly disposed on the base, a first magnet assembly, a first Hall sensor, and second driving coils; the first magnet assembly comprises first magnets disposed on the support frame; the first driving coil assembly comprises first driving coils disposed on the base; the first driving coils cooperate with the first magnets for driving the support frame to translate along the first axis and the second axis; the first Hall sensor is fixed on the base for detecting a displacement of the lens assembly;

wherein the second driving coils are disposed on the lens assembly; the second driving coils cooperate with the first magnet assembly for driving the lens assembly to translate along the optical axis.

2. The lens driving device according to claim 1, wherein the elastic sheet assembly comprises an upper elastic sheet, a lower elastic sheet, and anti-shake hanging wires; a first end of the upper elastic sheet is fixed to a top end of the support frame; a second end of the upper elastic sheet is fixed to a top end of the lens assembly; a first end of the lower elastic sheet is fixed to a bottom end of the support frame; a second end of the lower elastic sheet is fixed to a bottom end of the lens assembly; a first end of each of the anti-shake hanging wires is connected with the upper elastic sheet; a second end of each of the anti-shake hanging wire is fixed on the base; the support frame is supported on the base through the anti-shake hanging wires.

3. The lens driving device according to claim 1, wherein the first magnet assembly further comprises a second magnet fixed on one side of the support frame the second magnet is disposed on a side different from the first magnets; the first driving coil assembly comprises third driving coils for driving the second magnet and the support frame to rotate around the optical axis; wherein two third driving coils are provided; the two third driving coils are disposed on two ends of the second magnet; the two third driving coils drive the two ends of the second magnet to move in opposite directions to drive the support frame to rotate.

4. The lens driving device according to claim 3, wherein at least two second driving coils are provided; the at least two second driving coils are disposed oppositely on a peripheral wall of the lens assembly; a winding plane of each of the second driving coils is perpendicular to a winding plane of each of the first driving coils; the first magnet assembly comprises third magnets fixed on two sides of the support frame; positions of the third magnets correspond to positions of the second driving coils; the third magnets have a first magnetization direction parallel to the winding plane of each of the first driving coils and a second magnetization direction perpendicular to the winding plane of each of the first driving coils; the second driving coils drives the lens assembly to move with respect to the third magnets along a direction parallel to the optical axis; at least one of the third magnets is configured as one of the first magnets or the second magnet.

5. The lens driving device according to claim 3, wherein the first driving coil assembly is disposed on a first circuit board; the first circuit board comprises a printed circuit board (PCB) with a groove and a flexible printed circuit board (FPC) attached to a side of the PCB opposite to the base; the first driving coil assembly is embedded in the groove.

6. The lens driving device according to claim 1, wherein the second driving assembly comprises a second magnet assembly, a second driving coil assembly, a second circuit board, and a second Hall sensor; the second magnet assembly comprises at least two fourth magnets disposed on two adjacent first side walls of the first outer frame;

wherein the second driving coil assembly comprises at least two fourth driving coils disposed on two adjacent second side walls of the second outer frame; each of the fourth driving coils is disposed opposite to a corresponding fourth magnet; each of the fourth driving coils and the corresponding fourth magnet are spaced apart;

wherein the second circuit board is disposed on an outer periphery of the second outer frame and is electrically connected with the fourth driving coils;

wherein the second Hall sensor is disposed on the second circuit board for detecting a displacement of the first driving module.

7. The lens driving device according to claim 6, wherein a magnetic isolation plate is disposed on one side of each of the fourth magnets facing the lens assembly.

8. The lens driving device according to claim 5, wherein the first Hall sensor is disposed on the FPC; the first Hall sensor is disposed corresponding to two ends or a middle position of one or more of the first magnets and the second magnet of the first magnet assembly.

9. The lens driving device according to claim 1, wherein the bracket assembly comprises a bracket body disposed on an upper portion of the housing; first extension portions extending from two ends of the bracket body in a direction of the third axis, and second extension portions extending from another two ends of the bracket body in a direction of the fourth axis; the first extension portions are rotatably connected with the first outer frame; the second extension portions are rotatably connected with the second outer frame.

10. The lens driving device according to claim 9, wherein the first extension portions comprise first lower extension portions extending toward the base; the first lower extension portions comprise first shaft bases; the first outer frame comprises first shafts corresponding to the first shaft bases; each of the first shafts is disposed in a corresponding first shaft base.

11. The lens driving device according to claim 10, wherein each of the first shaft base is configured as a concave hemispherical surface; each of the first shafts is a hemispherical body; there is a gap between each of the first shafts and the corresponding first shaft base.

12. The lens driving device according to claim 9, wherein the second extension portions comprise a second lower extension portions extending toward the base; the second lower extension portions comprises second shaft bases; the second outer frame comprises second shafts corresponding to the second shaft bases; each of the second shafts is disposed in a corresponding second shaft base.

13. The lens driving device according to claim 12, wherein each of the second shaft base is configured as a concave hemispherical surface; each of the second shafts is a hemispherical body; there is a gap between each of the second shafts and the corresponding second shaft base.

14. A lens driving device, comprising:
a base;
a support frame having an accommodating space and supported on the base;
a housing covered on the base and making the support frame to be disposed in the housing;
a lens assembly accommodated in the accommodating space;
an elastic sheet assembly elastically supporting the lens assembly in the accommodating space;
a first driving coil assembly disposed on the base;
a first magnet assembly;
a first Hall sensor; and
second driving coils;
wherein the first magnet assembly comprises first magnets disposed on the support frame and first driving coils disposed on the base; the first driving coils cooperate with the first magnets for driving the support frame to translate along a first axis and a second axis;
wherein the first Hall sensor is fixed on the base for detecting a displacement of the lens assembly;
wherein the second driving coils are disposed on the lens assembly; the second driving coils cooperate with the first magnet assembly for driving the lens assembly to translate along an optical axis; wherein the first magnet assembly further comprises a second magnet fixed on one side of the support frame the first driving coil assembly comprises third driving coils for driving the second magnet and the support frame to rotate around the optical axis; wherein two third driving coils are provided; the two third driving coils are disposed on two ends of the second magnet; the two third driving coils drive the two ends of the second magnet to move in opposite directions to drive the support frame to rotate.

15. The lens driving device according to claim 14, wherein at least two second driving coils are provided; the at least two second driving coils are disposed oppositely on a peripheral wall of the lens assembly; a winding plane of each of the second driving coils is perpendicular to a winding plane of each of the first driving coils; the first magnet assembly comprises third magnets fixed on two sides of the support frame; positions of the third magnets correspond to positions of the second driving coils; the third magnets have a first magnetization direction parallel to the winding plane of each of the first driving coils and a second magnetization direction perpendicular to the winding plane of each of the first driving coils; the second driving coils drives the lens assembly to move with respect to the third magnets along a direction parallel to the optical axis; at least one of the third magnets is configured as one of the first magnets or the second magnet.

* * * * *